(12) United States Patent
Hyman

(10) Patent No.: US 6,195,152 B1
(45) Date of Patent: Feb. 27, 2001

(54) ACCESSORY FOR USE IN COPYING BOUND MATERIALS

(76) Inventor: Miles Anthony Hyman, 642 Sheppard Avenue East, Apartment 814, Toronto, Ontario (CA), M2K 1C1

(*) Notice: Subject to any disclaimer, the term of this patent is extended or adjusted under 35 U.S.C. 154(b) by 0 days.

(21) Appl. No.: 09/436,993

(22) Filed: Nov. 9, 1999

(30) Foreign Application Priority Data

Nov. 9, 1998 (CA) ................................................ 2253522

(51) Int. Cl.$^7$ ............................ G03B 27/52; G03B 27/04
(52) U.S. Cl. ................................................. 355/25; 355/82
(58) Field of Search ................................. 355/25, 24, 75, 355/82; 358/474, 498; 399/361, 362, 365, 377

(56) References Cited

U.S. PATENT DOCUMENTS

| | | | |
|---|---|---|---|
| 4,068,950 | * 1/1978 | Kito | ........................................ 355/75 |
| 5,053,819 | 10/1991 | Malyon et al. . | |
| 5,572,284 | 11/1996 | Fujioka . | |
| 5,712,718 | * 1/1998 | Chen | .................................... 359/201 |
| 5,751,461 | 5/1998 | Chen et al. . | |

* cited by examiner

Primary Examiner—David M. Gray
Assistant Examiner—Hung Henry Nguyen
(74) Attorney, Agent, or Firm—Ridout & Maybee; Dolly Kao

(57) ABSTRACT

The invention provides an accessory for use in copying a page of a bound material using a copier having a scanning window and an optical reader on one side of the window. The accessory includes a page engaging member for engaging a face of the page to be copied, the page engaging member having a light transmitting element engageable with a main portion of the face, and a side edge engageable with the face near a binding region of the bound material. The light transmitting element is adapted to transmit light from the copier to the main portion and back to the copier for processing by the optical reader. The accessory further includes a locator coupled to the page engaging member for locating the page in a selected position relative to the light transmitting element and means coupled to the page engaging member for positioning the accessory relative to the copier with the light transmitting element in registration with the window. When the accessory is so positioned, the page of the bound material may be placed face down against the page engaging member in a selected position using the locator with the main portion of the face engaging the light transmitting element and the side edge engaging the face near the binding region such that an opposite page or pages of the bound material can be made to extend beyond said side edge in a direction towards the window to minimize stress to the binding region and to ensure that the page to be copied will lie effectively flat for the purpose of producing a clear or complete copy.

14 Claims, 5 Drawing Sheets

ACCESSORY FOR USE IN COPYING BOUND MATERIALS

FIELD OF THE INVENTION

The present invention relates to accessories for use in copying bound materials, such as text books, using a copier such as a photocopier or a flat bed scanner.

BACKGROUND OF THE INVENTION

Bound materials, such as text books, are often difficult to photocopy or scan using a photocopier or a flat bed scanner, respectively. A substantial downward pressure is required to force a particular page or pages of the bound material onto a planar scanning window of the photocopier or flat bed scanner so that the print which is close to the binding region of the bound material may come within the optical field of view of an optical reader disposed on the other side of the window. Sometimes, even with applied pressure, it is still not possible to bring the print within the field of view of the optical reader. As a result, in the case of photocopiers, the copy made may be blurred in the binding region. In the case of scanners, material near the binding region may be missed. Also, the downward pressure may damage the spine or binding of the bound material and increase the wear and tear of a copier scanning window thereby necessitating replacement of the material and window earlier than desired.

The present invention is intended to overcome the above difficulties.

SUMMARY OF THE INVENTION

The invention provides an accessory for use in copying a page of a bound material using a copier having a scanning window and an optical reader on one side of the window. The accessory includes a page engaging member for engaging a face of the page to be copied, the page engaging member having a light transmitting element engageable with a main portion of the face, and a side edge engageable with the face near a binding region of the bound material. The light transmitting element is adapted to transmit light from the copier to the main portion and back to the copier for processing by the optical reader. The accessory further includes a locator coupled to the page engaging member for locating the page in a selected position relative to the light transmitting element and means coupled to the page engaging member for positioning the accessory relative to the copier with the light transmitting element in registration with the window. When the accessory is so positioned, the page of the bound material may be placed face down against the page engaging member in a selected position using the locator with the main portion of the face engaging the light transmitting element and the side edge engaging the face near the binding region such that an opposite page or pages of the bound material can be made to extend beyond said side edge in a direction towards the window to minimize stress to the binding region and to ensure that the page to be copied will lie effectively flat for the purpose of producing a clear or complete copy.

Devices according to the present invention make it possible for a user to photocopy or scan a complete page of a bound material without the need to place a substantial downward pressure on the bound volume. The locator allows a user to quickly align pages of a bound material during copying for consistent results.

BRIEF DESCRIPTION OF THE DRAWINGS

For a better understanding of the invention, preferred embodiments will now be described with reference to the drawings in which.

DETAILED DESCRIPTION OF THE PREFERRED EMBODIMENTS

Figure 1:
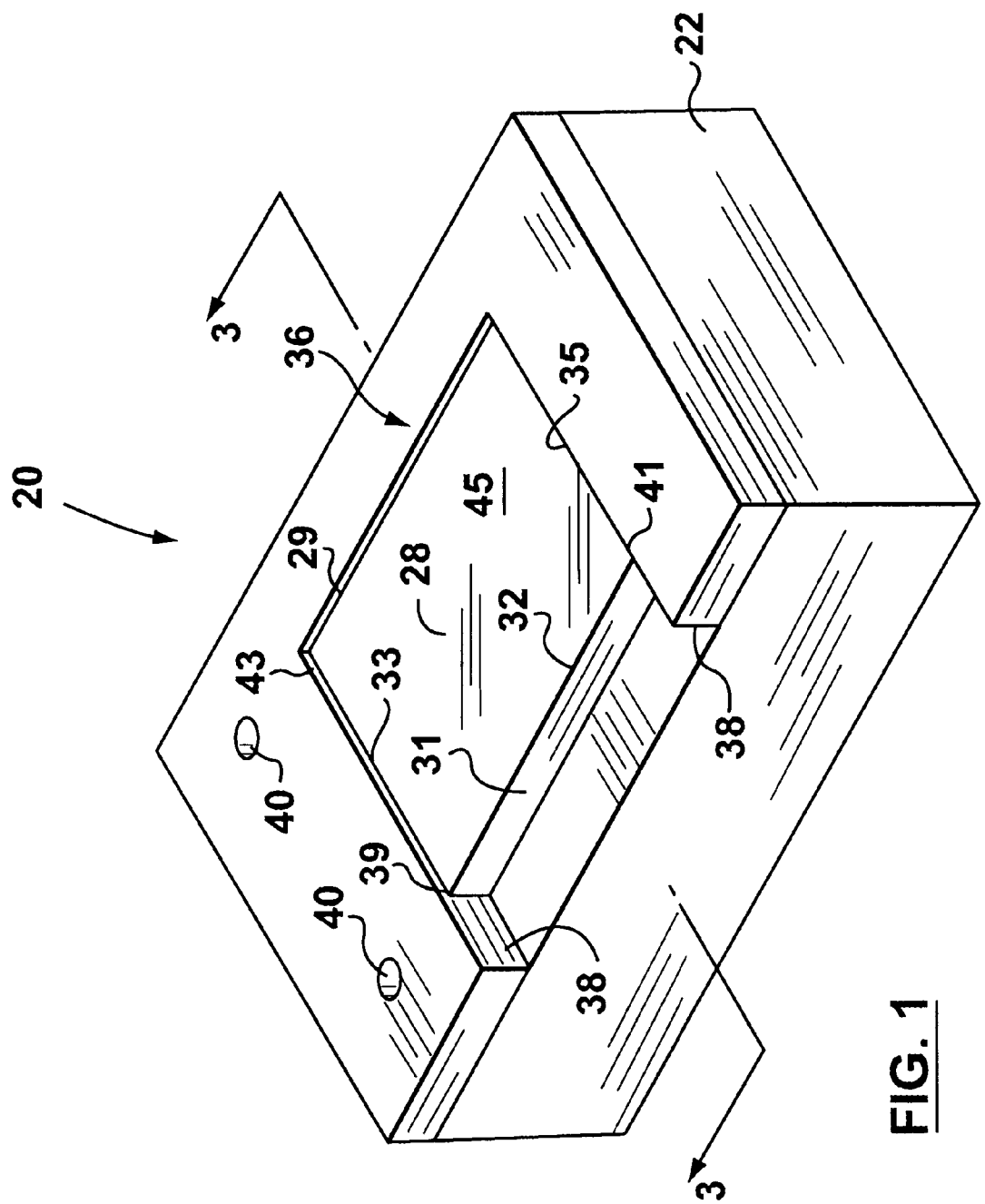
FIG. 1 is a schematic isometric view of an accessory according to a first preferred embodiment of the invention and attached to a conventional flat bed scanner.
Figure 2:
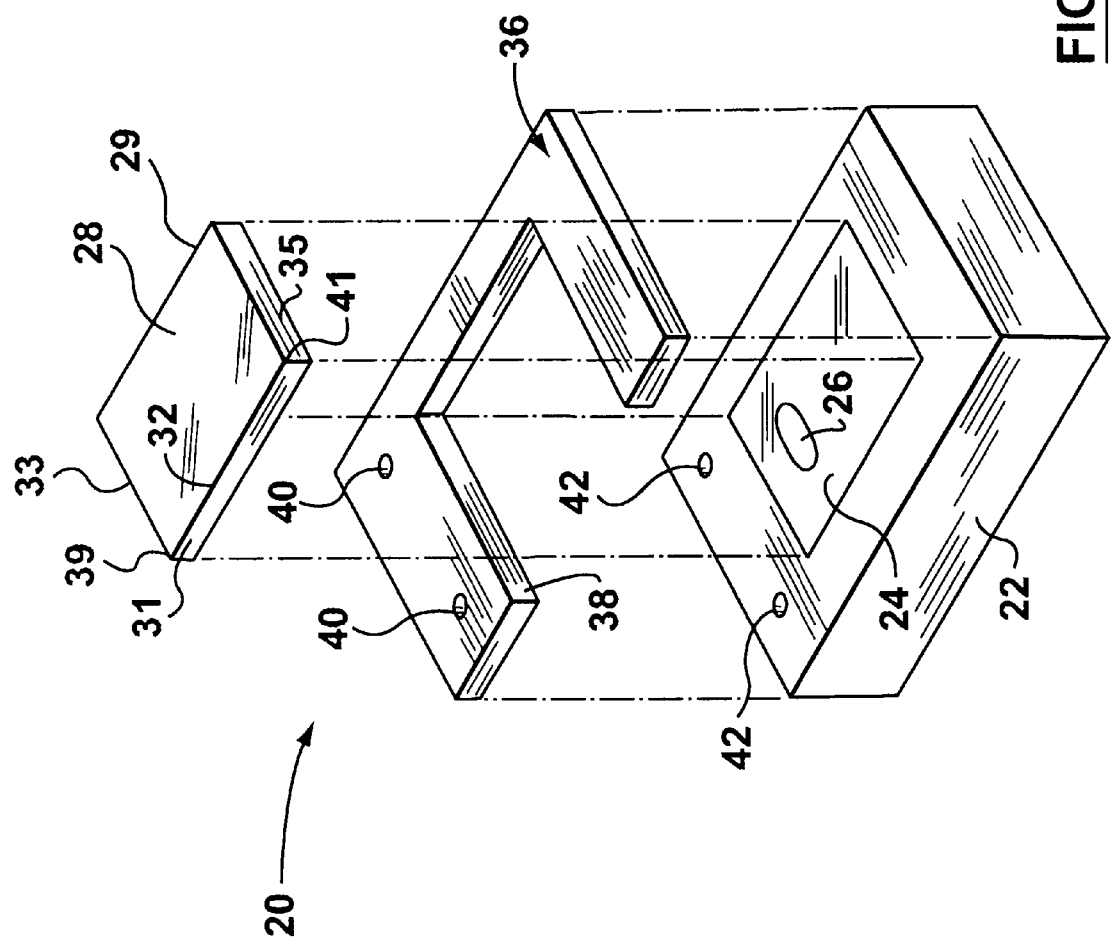
FIG. 2 is a schematic exploded isometric view of the accessory and scanner.
Figure 3:
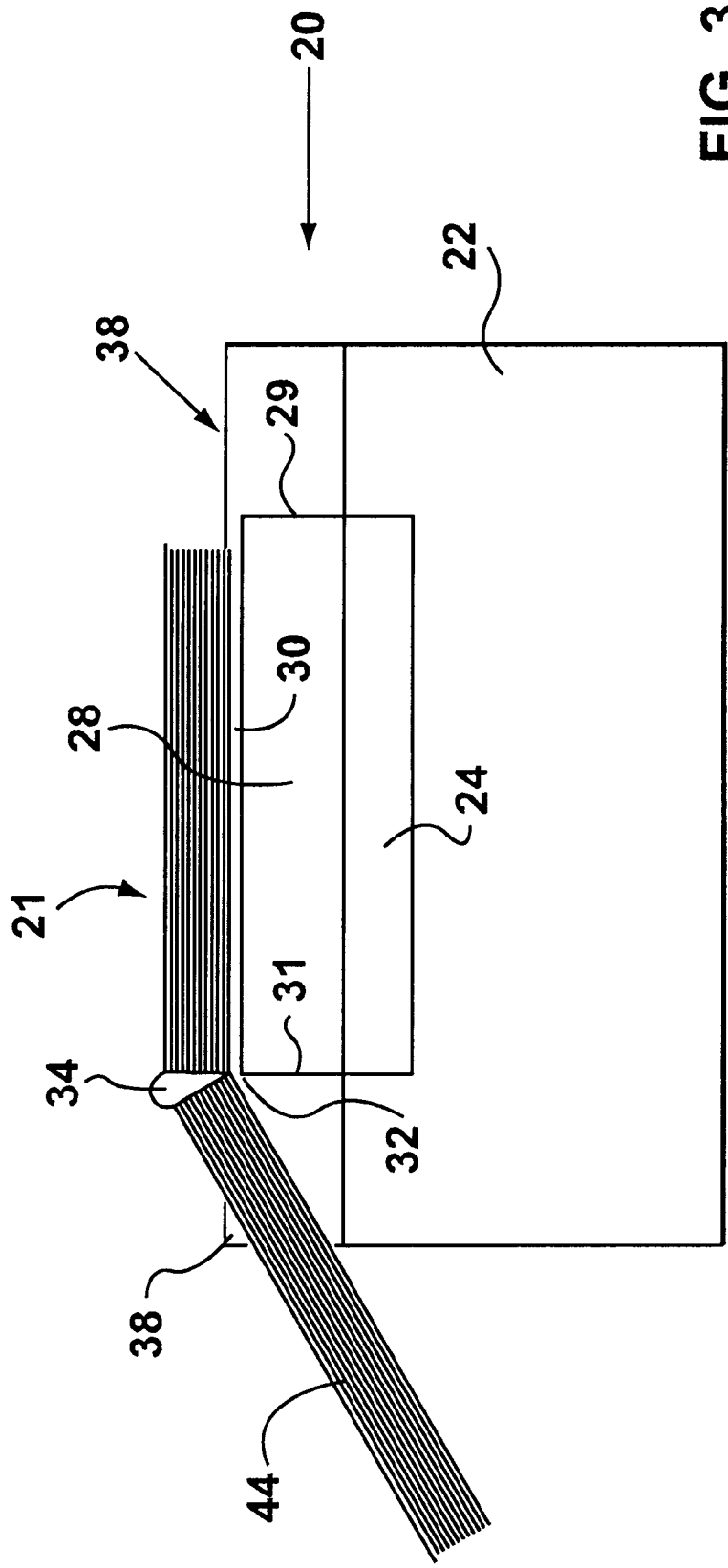
FIG. 3 is a schematic sectional view of the accessory and scanner taken generally along line 3—3 of FIG. 1.

Referring to FIGS. 1 to 3, an accessory for use in copying a page of a bound material according to a first preferred embodiment of the invention is shown schematically and designated generally by reference numeral 20. In this case, the bound material is in the form of a text book 21 (shown schematically in FIG. 3) and the copier is a conventional flat bed scanner 22 (also shown schematically) having a scanning window 24 and a movable optical reader 26 disposed below the window (see FIG. 2).

The accessory 20 includes a page engaging member which in this embodiment consists of a light transmitting element in the form of a conventional non-polarized plastic rectangular lens 28. The lens is coated with a diamond coating for abrasion resistance and has a pair of spaced parallel sides 29, 31 and a pair of spaced parallel ends 33, 35 extending between the sides 29, 31. One side 31 defines a straight side edge 32 of the lens 28 which is engageable with a binding region 34 of the text book 21 as will be discussed further below. The lens 28 is engageable with a face 30 of a page of the text book 21 to be scanned and possesses optical characteristics which allow it to transmit light from the scanner 22 to the page and back to the scanner 22 for processing by the optical reader 26 during copying.

The accessory 20 further includes a locator for locating a page to be copied in a selected position relative to the lens 28. The locator is in the form of a C-shaped frame 36 attached to and bordering ends 33, 35, and the side 29 of the lens 28. As can be seen in FIGS. 1 and 3, the frame 36 can be seen to have stop members in the form of extensions 38 extending from ends 39, 41 of the side edge 32 and away from the lens 28. Furthermore, the accessory 20 includes an abutment member consisting of that portion 43 of the frame 38 standing proud of an upper page engaging surface 45 of the lens 28. The extensions 38 and the portion 43 of the frame 38 can be used to quickly and easily position the text book 21 during copying for consistent results. Positioning is achieved by either placing an edge of the page to be copied in abutment with the portion 43 of the frame or by bringing a portion 44 (shown in FIG. 3) of the text book 21 extending beyond the side edge 32 towards the window 24 into engagement with at least one of the extensions 38.

The accessory 20 further includes means for positioning the accessory 20 relative to the scanner 22 with the lens 28 in registration with the window 24. In this embodiment, positioning means consists of a releasable attachment mechanism for releasably attaching the accessory 20 to the scanner 22 in the form of a pair of spaced apertures 40 which register with apertures 42 (see FIG. 2) in the scanner 22. A cover of the scanner (not shown) is used to secure the frame 38 to the scanner 22 by inserting a pair of spaced prongs of the cover through the aligned apertures 40 and 42. The accessory 20 is portable and may be quickly and easily detached from the scanner 22 and attached to another copying device having similar cover attachment means.

With the accessory 20 attached to the scanner as shown, a page of the text book 21 may be scanned as follows. As shown in FIG. 3, the page is positioned with its face 30 lying against the lens 28 and with the side edge 32 engaging the face 30 near the binding region 34 of the text book 21. Opposite pages of portion 44 of the text book 21 can thus be angled downwardly over the side edge 32 in a direction towards the window 24. In this way, stress to the binding region 34 is minimized and the page to be copied is made to lie effectively flat such that a clear copy may be made.

Figure 4:
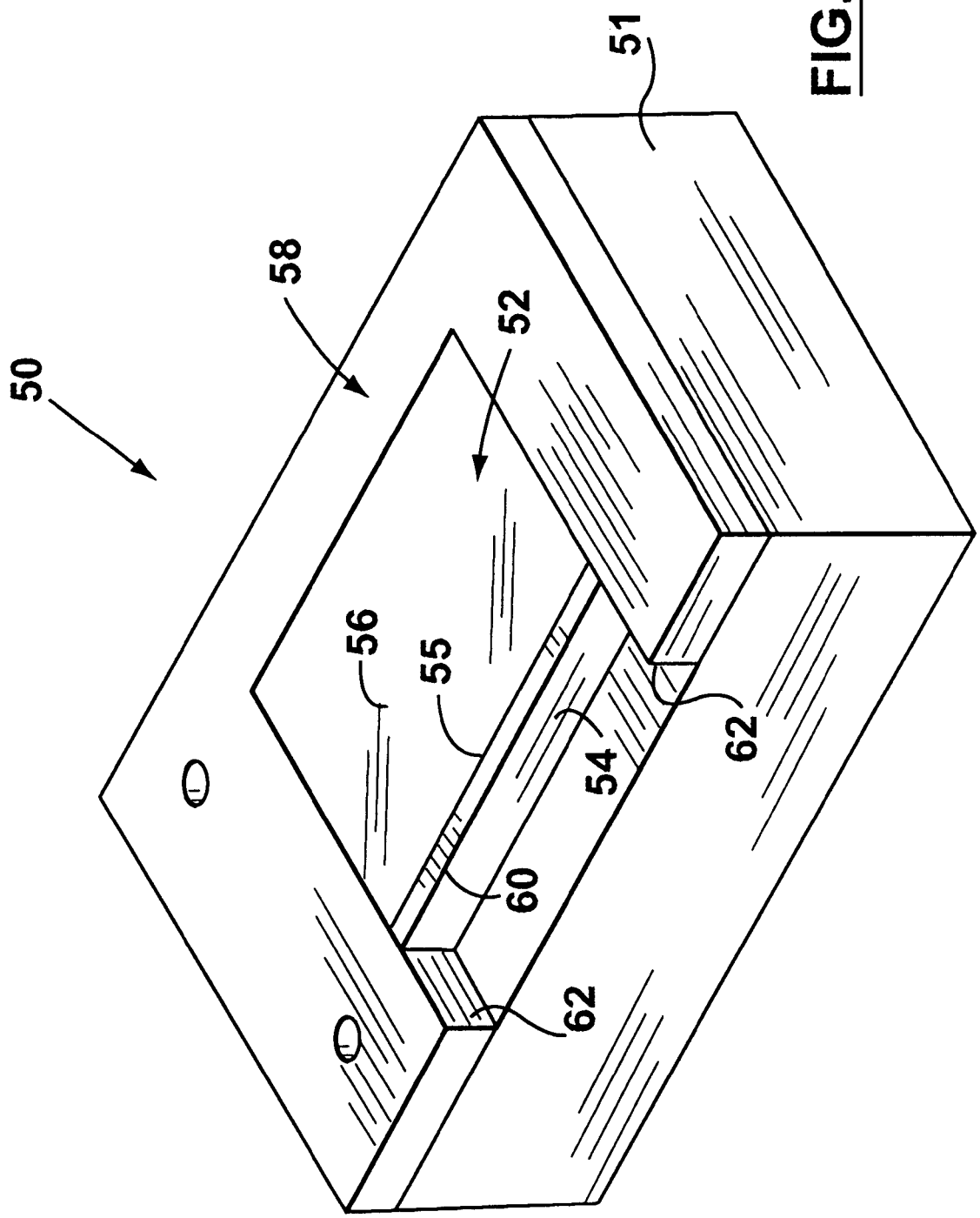
FIG. 4 is a schematic isometric view of an accessory according to a second preferred embodiment of the invention and attached to a photocopier.

Referring now to FIG. 4, an accessory 50 according to a second embodiment of the invention and affixed to a photocopier 51 is shown. This embodiment is to be preferred in situations where the accessory 50 is used on a variety of copiers and is therefore attached and detached from different copiers regularly. The accessory 50 is similar to the accessory 20 of the first preferred embodiment except as follows. The accessory 50 has a page engaging member 52 including a thin frame member 54 extending along one side 55 of a light transmitting element in the form of a conventional rectangular composite plastic lens 56. The thin frame member 54 is attached at its ends to a larger C-shaped frame member 58. The frame members 54, 58 are attached to and border the lens 56 on all sides thereby protecting the lens against shock and injury during transport and handling. The page engaging member 52 has a side edge defined by a straight side edge 60 of the thin frame member 54. This side edge 60 has the same function as the side edge 32 of the first preferred embodiment described above.

The page engaging member 52 has a thickness similar to the thickness of the frame 58 and therefore lies flush with the frame. A page of a bound material to be copied may be located relative to the lens 56 using locators in the form of extensions 62 of the frame 58.

The accessory 50 is to be used in the same manner as the accessory 20 described above. In use, a bound material to be copied is positioned on the accessory 50 with the page thereof to be copied lying face down against the lens 56 and a binding region of the material disposed proximate to the side edge 60 of the thin frame member 54. Opposing pages of the bound material may be made to overhang the side edge 60 thereby allowing the page to be copied to lie effectively flat for the purpose of producing clear copies. Also, since the opposing pages can extend downwardly over the side edge (i.e. towards a scanning window (not shown) of the photocopier 51), stress to the binding region of the material is minimized. The overhanging portion of the bound material may be brought quickly into engagement with the extensions 62 to allow for rapid alignment of the page to be copied relative to the lens 56. As most bound materials do not contain print matter in the margins of pages adjacent to the bound regions of the materials, the thin frame member 54 will not block any print or indicia to be copied. However, where print matter is contained in the margins, then the accessory 20 of the first preferred embodiment is to be preferred.

Figure 5:
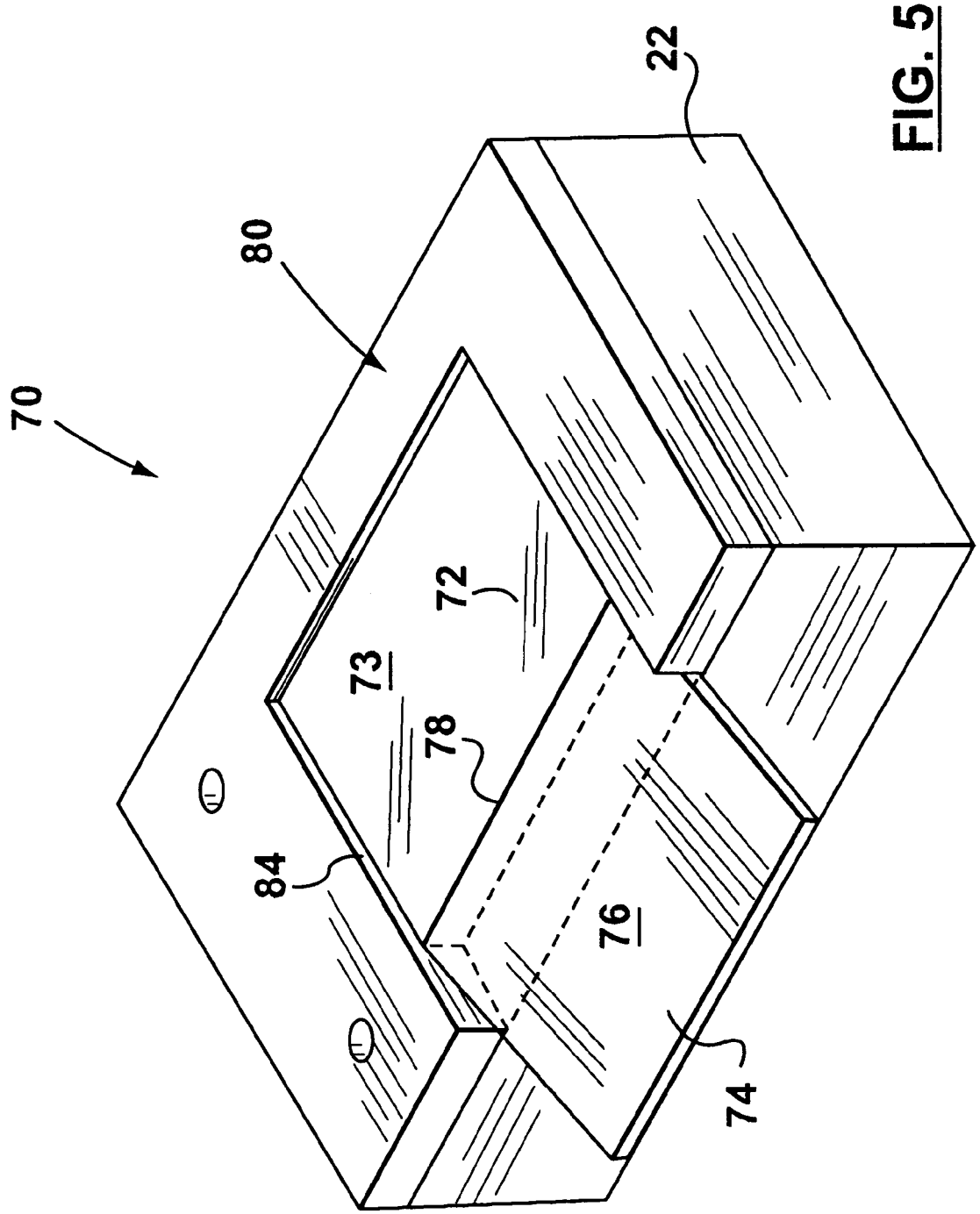
FIG. 5 is a schematic isometric view of an accessory according to a third preferred embodiment having an angled support and attached to the flat bed scanner of FIGS. 1 to 3.

Referring now to FIG. 5, an accessory 70 according to a third preferred embodiment of the invention is shown attached to the flat bed scanner 22 of FIGS. 1 to 3. This embodiment is to be preferred in situations where the bound material to be copied is large or heavy. The accessory 70 is similar to the accessory 20 of the first preferred embodiment except that it includes a page engaging member in the form of a plastic lens 72 having an upper page engaging surface 73 and an angled support member 74 integrally formed with the lens 72 and having a support surface 76 meeting the page engaging surface 73 at a side edge 78 of the lens 72. The support surface 76 is angled away from the page engaging surface 73 towards the window 24 of the scanner 22. Thus, the angled support member 74 is for supporting portions of a bound material extending beyond the side edge 78 during copying. This reduces the strain on the user of having to support part of the weight of the bound material while copying. Since it is angled downwardly, pages of a bound material, opposing a page thereof being copied, may still overhang the side edge 78 thereby allowing the page being copied to lie effectively flat while at the same time reducing the degree of stress applied to a binding region of the bound material.

Similar to the accessory 20, the accessory 70 includes a frame 80 bordering a pair of opposed ends and a side of the lens 72. The frame 80 stands proud of the upper page engaging surface 73 of the lens 72 and the support surface 76 of the angled support member 74 thereby providing a C-shaped abutment or stop member 84 for use in quickly locating or aligning a page of a bound material during copying.

The copiers described above all have light sources disposed on the same side of the scanning windows as the optical readers. However, it will be appreciated that accessories according to the present invention will also be useful in copying bound transparencies using a copier having a window, an optical reader on one side of the window, and a light source on the other side of the window. With respect to this type of copier, as in the case of the above examples, the accessory is positioned with the light transmitting element thereof in registration with the window. However, in this case, the accessory is interposed between the light source of the copier and the window. A transparent page to be copied may therefore be placed on the light transmitting element, between the element and the light source, and light emanating from the light source can travel, in series, through the transparent page, the light transmitting element, and the window, to the optical reader for processing.

Having described the preferred embodiments, variations thereto will now be discussed. Embodiments according to the present invention may be used in connection with any copiers or copying devices having a scanning window and an optical reader disposed on one side of the window. Further, they may be used in conjunction with conventional copiers without requiring modification of the copiers. When used with copiers having document feeders, accessories according to the invention will not interfere with the normal operation of these feeders. The dimensions and shape of accessories according to the invention may be varied to suit different kinds and models of copiers.

The frame may be made of any suitable material including plastic, metal, wood, and their composites.

The light transmitting element may be made of any suitable material having optical transmission characteristics which would transmit light from the copier to a page placed against the element and back to the copier, or, light from a transparent or translucent page to the copier, in time for processing by an optical reader of the copier. The element may be made of plastic, treated plastic, glass or a composite of materials. The element may be solid or hollow, optically clear or tinted, and may have any suitable dimension or shape, including thickness. Further, the element may be dimensioned to cover the entire surface area of a window of a copier or a selected portion thereof. The page engaging and window engaging surfaces of the element may be smooth or textured. Furthermore, the light transmitting element may be polarized or non-polarized, and it may be tailored to transmit light of selected frequencies.

The frame of each of the accessories described above is optional. The light transmitting element may be affixed to copiers using any known means of attachment.

It will be appreciated that the foregoing description is by way of example only and is not meant to limit the scope of the invention as defined by the claims herein.

I claim:

1. An accessory for use in copying a page of a bound material using a copier, the copier having a scanning window and an optical reader on one side of the window, the accessory comprising a page engaging member for engaging a face of the page to be copied, the page engaging member having a light transmitting element engageable with a main portion of the face, and a side edge engageable with the face near a binding region of the bound material, said light transmitting element being adapted to transmit light from the copier to the main portion and back to the copier for processing by the optical reader;

a locator coupled to the page engaging member for locating the page in a selected position relative to the light transmitting element; and means coupled to the page engaging member for positioning the accessory relative to the copier with the light transmitting element in registration with the window;

whereby, when the accessory is so positioned, the page of the bound material may be placed face down against the page engaging member in a selected position using the locator with the main portion of the face engaging the light transmitting element and the side edge engaging the face near the binding region such that an opposite page or pages of the bound material can be made to extend beyond said side edge in a direction towards the window to minimize stress to the binding region and to ensure that the page to be copied will lie effectively flat for the purpose of producing a clear or complete copy.

2. An accessory according to claim 1 wherein said light transmitting element has a side edge defining said side edge of the page engaging member.

3. An accessory according to claim 2 wherein said locator comprises a stop member extending from an end of the side edge and away from said page engaging member, whereby a portion of a bound material being copied also extending beyond the side edge may be brought into engagement with said stop member thereby locating a page to be copied of the bound material in a selected position relative to the light transmitting element.

4. An accessory according to claim 3 wherein said locator comprises an abutment member bordering at least a portion of an outer perimeter of said page engaging member standing proud of a page engaging surface of said page engaging member, whereby a page to be copied may be brought into engagement with said stop member thereby locating the page in a selected position relative to the light transmitting element.

5. An accessory according to claim 4 wherein said page engaging member is rectangular and has a pair of spaced parallel sides and a pair of spaced parallel ends extending between said sides, one of said sides containing said side edge, the accessory further including a frame bordering said ends and the side opposed to the side containing the side edge, said frame standing proud of a page engaging surface of the page engaging member and including a pair of extensions extending beyond said side edge, said frame defining said locator.

6. An accessory according to claim 5 wherein the positioning means comprises a releasable attachment mechanism for releasably attaching the accessory to a copier.

7. An accessory according to claim 6 further comprising an angled support member coupled to the page engaging member, the support ;member being for supporting portions of the bound material extending beyond the side edge during copying.

8. An accessory according to claim 1 wherein said page engaging member includes a thin frame member extending along one side of said light transmitting element, the thin frame member having a side edge defining said side edge of the page engaging member.

9. An accessory according to claim 1 wherein said locator comprises a stop member extending from an end of the side edge and away from said page engaging member, whereby a portion of a bound material being copied also extending beyond the side edge may be brought into engagement with said stop member thereby locating a page to be copied of the bound material in a selected position relative to the light transmitting element.

10. An accessory according to claim 1 wherein said locator comprises an abutment member bordering at least a portion of an outer perimeter of said page engaging member standing proud of a page engaging surface of said page engaging member, whereby a page to be copied may be brought into engagement with said stop member thereby locating the page in a selected position relative to the light transmitting element.

11. An accessory according to claim 1 wherein said page engaging member is rectangular and has a pair of spaced parallel sides and a pair of spaced parallel ends extending between said sides, one of said sides containing said side edge, and wherein said locator comprises a frame bordering said ends and the side opposed to the side containing the side edge, said frame standing proud of a page engaging surface of said page engagement member and extending beyond said side edge away from said page engaging member, whereby a bound material may be brought into engagement with the frame, thereby locating a page thereof to be copied in a selected position relative to the light transmitting element.

12. An accessory according to claim 1 wherein the positioning means comprises a releasable attachment mechanism for releasably attaching the accessory to a copier.

13. An accessory according to claim 1 wherein the page engaging member has a page engaging surface, the accessory further comprising an angled support member for supporting portions of the bound material extending beyond the side edge during copying, the angled support member being coupled to the page engaging member and having a support surface meeting the page engaging surface at said side edge, the support surface being angled away from the page engaging surface towards the window.

14. A method of copying a bound material comprising the steps of:

(a) providing an accessory according to claim 1 positioned in place on a copier having a scanning window and an optical reader on one side of the window, said accessory being positioned with said light transmitting element in registration with said window; and (b) placing a page of a bound material to be copied face down on said page engaging member for copying by said copier.

* * * * *